Aug. 31, 1954  R. C. PALMER  2,688,075
SAWTOOTH WAVE GENERATOR
Filed Oct. 15, 1949
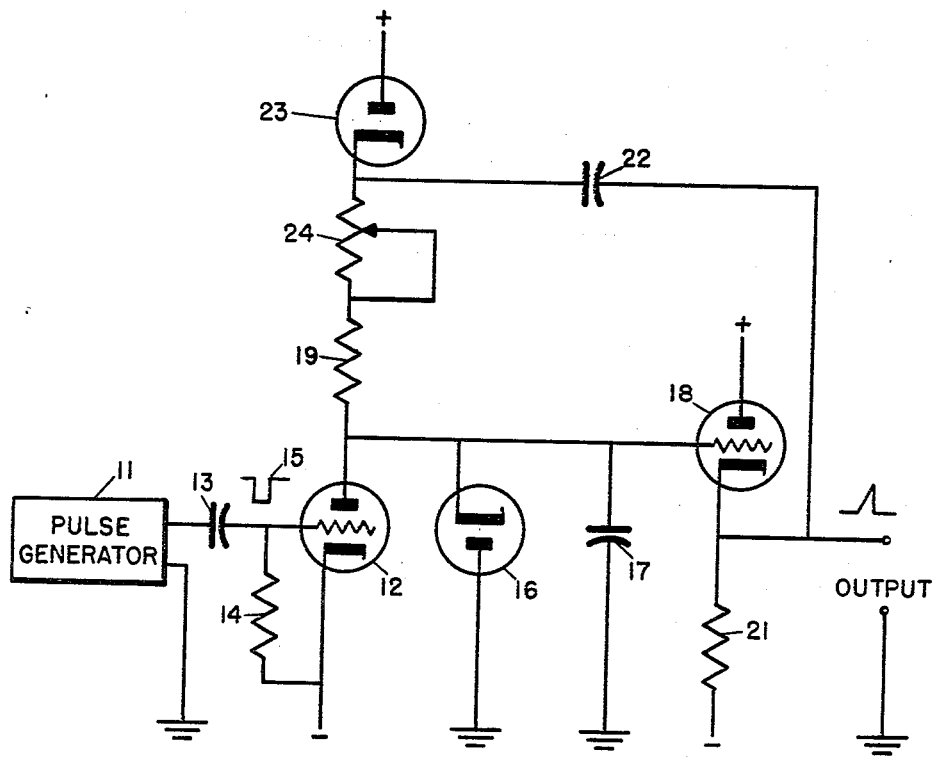
INVENTOR.
Richard C. Palmer
BY Darby & Darby
Attorneys Patented Aug. 31, 1954

2,688,075

UNITED STATES PATENT OFFICE 2,688,075

SAWTOOTH WAVE GENERATOR

Richard C. Palmer, Nutley, N. J., assignor to Allen B. Du Mont Laboratories, Inc., Passaic, N. J., a corporation of Delaware Application October 15, 1949, Serial No. 121,501

6 Claims. (Cl. 250—27)

This invention relates to electronic sawtooth wave voltage generators.

In the prior art driven sawtooth voltage or sweep generators, variation of the charging resistance for the purpose of changing the sweep speed was accompanied by an undesired change in the starting potential across the sweep condenser.

Consequently it is one object of this invention to produce a more stable driven sweep generator.

A second object is to reduce the variations in the starting potential across the sweep condenser due to changing the sweep speed of a driven sawtooth voltage generator.

Other objects will be apparent from the following specification taken together with the drawing, in which there is shown a schematic diagram of a sawtooth wave generator incorporating the invention.

The output of a pulse generator 11 is connected to the grid of a trigger tube 12 by means of condenser 13 and resistor 14. The cathode of the tube 12 is connected to a source of negative potential. The plate of the trigger tube 12 is connected ot the common junction of the cathode of a clamping diode 16, one terminal of sweep condenser 17, the grid of a cathode follower tube 18, and one end of a resistor 19. The plate of the clamping diode 16 and the other terminal of the sweep condenser 17 are connected to ground. The load resistor 21 for the tube 18 is connected between a source of negative voltage and the common junction of the cathode of tube 18 and one terminal of a feedback condenser 22. The other terminal of the feedback condenser 22 is connected to the junction of the cathode of a charging diode 23 and one end of a variable resistor 24. The other end of the variable resistor 24 is connected to the remaining free end of resistor 19. The sweep voltage output terminals are the cathode of tube 18 and ground.

In normal operation a negative pulse, indicated at 15, generated by the pulse generator 11 is applied to the grid of the tube 12. This negative pulse must have sufficient amplitude to cut off the plate current of tube 12 and keep it cut off for the duration of the pulse. Cutting off the plate current through tube 12 triggers the sweep generator into operation, and condenser 17 starts to charge by means of the current flowing through diode 23 and resistors 19 and 24. The time constant of this charging circuit may, of course, be changed by varying resistors 19 or 24 or condenser 17, but this effect is altered by the presence of the diode 16 in the circuit as will be explained.

The voltage at the plate of tube 12 has a value equal to the voltage at the cathode of tube 12 plus the IR drop due to the plate resistance. If the voltage at the cathode is made sufficiently negative so that the voltage at the plate is negative with respect to ground during the conduction period, current will flow through the diode 16. Since the impedance of diode 16 may be made very low, the voltage drop thereacross will not be great, so that the voltage at the plate of tube 12 will be clamped to a value only slightly below ground potential. Hence the voltage across the sweep condenser 17, which is equal to the voltage across the clamping diode 16, is limited to a small value during the conduction period of tube 12.

For a given setting of resistor 24, condenser 17 starts to charge at the same rate each time the plate current of tube 12 is cut off. Furthermore, the voltage across condenser 17 is the same during each conduction period of tube 12. If diode 16 were disconnected from the circuit, the voltage across condenser 17 would still have a uniform value during the conduction periods of tube 12, but the uniform value with diode 16 out of the circuit would not necessarily be the same as the uniform value with diode 16 in the circuit.

If, assuming the diode 16 to be out of the circuit, the setting of resistor 24 be changed in order to change the charging rate of condenser 17 which would change the speed of the sweep voltage, the voltage across condenser 17 during the conduction period of tube 12 would assume a new uniform value. This result is to be expected when it is considered that diode 23, resistors 24 and 19, and tube 12 form a simple voltage divider so that changing the impedance of any element without changing the total D. C. voltage between the plate of diode 23 and the cathode of tube 12 would naturally change the voltage between any two points in the divider.

Connecting the clamping diode 16 back into the circuit changes the simple voltage divider into a more complicated one since current can flow through diode 16 and thence through tube 12 under the conditions as stated before, thereby limiting the voltage across condenser 17 to a small, relatively fixed value during the conduction period of tube 12 no matter how the resistance 24 is varied.

The voltage across condenser 17 is the input voltage of the cathode follower 18, and when condenser 17 starts to charge up toward the potential on the plate of diode 23 along the well-known exponential curve, the voltage at the cathode of tube 18 follows. However, the voltage at the cathode of tube 18 is fed back by means of condenser 22 to the common junction of the cathode of diode 23 and the high potential end of resistor 24. Since the voltage fed back to the high potential end of resistor 24 by condenser 22 is proportional to the voltage at the cathode of tube 18, the voltage between the cathode of diode 23 and ground increases as condenser 17 charges. As the voltage on the cathode of diode 23 increases, it reaches the level of the voltage on the plate of diode 23 at which time diode 23 ceases to draw current, and condenser 17 continues to charge by discharging condenser 22. One advantage of this feedback process is that the higher the voltage across condenser 17 becomes, the higher is the voltage at the high potential end of resistor 24. Thus the charging rate is made more linear because condenser 17 charges toward an increasingly positive potential. This charging process cannot continue indefinitely since eventually condenser 17 would discharge condenser 22 to the point at which the cathode of diode 23 would again become negative with respect to the plate, and the final voltage across condenser 17 would be slightly less than the voltage between the plate of diode 23 and ground.

Preferably the end of the negative pulse 15 would occur while condenser 17 was still charging linearly. At the end of pulse 15, tube 12 resumes conduction, discharging condenser 17. As the voltage across condenser 17 decreases, diode 23 resumes conducting which allows condenser 22 to return to its normally charged state by the charging circuit consisting of diode 23 and tube 18 in parallel with resistor 21. At the same time the voltage across condenser 17 continues to decrease approximately exponentially through tube 12, diode 23 and resistors 19 and 24 toward a voltage level determined by the previously mentioned simple voltage divider. As stated before, this level is such that the grounded terminal of condenser 17 would actually be positive with respect to the other terminal. However, when the voltage on the cathode of diode 16 becomes negative with respect to ground, the clamping action of diode 16 takes place and the negative swing of condenser 17 is halted. The apparatus is then ready to begin a new cycle of operation.

Although I have described my invention in terms of a single embodiment, it will be obvious to those skilled in the art that various modifications may be made within the spirit of the invention without departing from the scope of the following claims.

What is claimed is:

1. In a driven sweep oscillator of the character described a voltage divider between a source of potential and a second source of potential negative with respect to said first source, said voltage divider comprising in order a first electron discharge tube, a resistance, and a second electron discharge tube having an anode; a condenser connecting the anode of said second tube to a third source of potential intermediate the first two potentials; a source of intermittent biasing voltage connected to said second tube to cause said tube to be periodically nonconducting; and an electron discharge switching device in parallel with said condenser, said switching device presenting a low impedance across said condenser during periods between the intermittent biasing voltages and a high impedance during said intermittent biasing voltages.

2. A sawtooth voltage generator comprising a source of positive potential, a source of negative potential, a voltage divider comprising in order a first electron discharge tube, a resistance, and a second electron discharge tube having an anode; a source of potential intermediate said positive and said negative potentials; a third electron discharge tube connected between said third source of potential and the anode of said second tube; a condenser connected directly in parallel with said third tube; a fourth electron discharge tube connected to said condenser to amplify the voltage thereacross; a connection between said fourth tube and a second tap on said voltage divider intermediate said positive potential and said first mentioned tap to feed back a portion of the amplified voltage.

3. A sawtooth voltage generator comprising a direct current voltage source having a positive terminal, a negative terminal, and an intermediate terminal; a condenser having a first terminal connected to said intermediate terminal; a series charging circuit connecting the other terminal of said condenser to said positive terminal, said charging circuit comprising a resistor connected to said other terminal of said condenser; a discharging circuit connecting said other terminal to said negative terminal, said discharging circuit comprising a gating tube having a cathode connected directly to said negative terminal and an anode connected directly to said other terminal of said condenser, said gating tube being normally conductive to discharge said condenser; means to render said tube non-conductive to generate said sawtooth voltage; and a clamping tube having an anode connected directly to said first terminal of said condenser and a cathode connected directly to said other terminal of said condenser.

4. A sawtooth voltage generator comprising a direct current voltage source having a positive terminal, a negative terminal, and an intermediate terminal; a series charging circuit comprising a resistor connected to said positive terminal and a condenser connected to said intermediate terminal, said resistor and condenser having a common junction; a discharging circuit comprising a gating tube having an anode connected directly to said junction and a cathode connected directly to said negative terminal, said gating tube being normally conductive thereby maintaining said condenser discharged; means to render said tube non-conductive to generate said sawtooth voltage; and a diode connected directly in parallel with said condenser with the cathode of said diode being connected to said junction.

5. A sawtooth voltage generator comprising a direct current voltage source having a positive terminal, a negative terminal, and an intermediate terminal; a condenser having a first terminal connected to said intermediate terminal, a series charging circuit connecting the other terminal of said condenser to said positive terminal, said charging circuit comprising a diode having its plate connected to said positive terminal and a resistor having one end thereof connected to the cathode of said diode and the other end thereof connected to said other terminal of said condenser; a discharging circuit connecting said other terminal to said negative terminal, said discharging circuit comprising a gating tube having a cathode connected directly to said negative terminal and an anode connected directly to said other terminal of said condenser, said gating tube being normally conductive to discharge said condenser; means to render said gating tube non-conductive to generate said sawtooth voltage; a clamping diode connected directly in parallel with said condenser and having a cathode thereof connected to said other terminal of said condenser; and a feed back amplifier having an input circuit connected to said condenser to amplify the voltage thereacross and having an output circuit connected to said cathode of said first named diode.

6. A sawtooth wave voltage generator comprising a condenser across which said sawtooth voltage is generated, a direct current voltage source, a voltage divider network connected between a terminal of said voltage source positive with respect to one terminal of said condenser and a second terminal of said voltage source negative with respect to said condenser terminal, said voltage divider network comprising a switching tube having an anode and a cathode, the said terminal of said condenser being connected to said anode, said cathode being connected to said second terminal of said voltage source; and a clamping tube connected directly in parallel with said condenser, said clamping tube being polarized to be conductive only when said switching tube is conductive.

References Cited in the file of this patent

UNITED STATES PATENTS

| Number | Name | Date |
| --- | --- | --- |
| 2,139,432 | Andrieu | Dec. 6, 1938 |
| 2,139,467 | Roosenstein | Dec. 6, 1938 |
| 2,341,396 | Smith | Feb. 8, 1944 |
| 2,411,573 | Holst et al. | Nov. 26, 1946 |
| 2,412,542 | Smith | Dec. 10, 1946 |
| 2,438,907 | Frankel et al. | Apr. 6, 1948 |
| 2,479,081 | Poch | Aug. 16, 1949 |
| 2,532,534 | Bell | Dec. 5, 1950 |
| 2,554,172 | Custin | May 22, 1951 |